(12) United States Patent
Morozov et al.

(10) Patent No.: US 6,208,798 B1
(45) Date of Patent: Mar. 27, 2001

(54) VARIABLE OPTICAL ATTENUATOR WITH THERMO-OPTIC CONTROL

(75) Inventors: Val N. Morozov; Haining Fan, both of San Jose; Long Yang, Union City, all of CA (US)

(73) Assignee: E-Tek Dynamics, San Jose, CA (US)

( * ) Notice: Subject to any disclaimer, the term of this patent is extended or adjusted under 35 U.S.C. 154(b) by 0 days.

(21) Appl. No.: 09/518,322

(22) Filed: Mar. 3, 2000

(51) Int. Cl.$^7$ ....................................................... G02B 6/00
(52) U.S. Cl. ................................................................ 385/140
(58) Field of Search ..................................... 385/140–147

(56) References Cited

U.S. PATENT DOCUMENTS

| | | |
|---|---|---|
| 4,426,215 | 1/1984 | Murphy . |
| 4,557,557 | 12/1985 | Gleason et al. . |
| 4,599,098 | * 7/1986 | Sarkar ....................................... 65/421 |
| 4,842,358 | * 6/1989 | Hall ............................................ 385/12 |
| 4,887,900 | * 12/1989 | Hall ........................................... 356/464 |
| 4,915,503 | * 4/1990 | Pavlath ..................................... 356/460 |
| 4,960,319 | * 10/1990 | Dankowych .............................. 385/1 |
| 5,050,956 | 9/1991 | Carpenter et al. . |
| 5,701,382 | 12/1997 | Grois et al. . |
| 5,966,493 | * 10/1999 | Wagoner et al. ........................ 385/140 |

OTHER PUBLICATIONS

Webpage of Conference Abstracts, Optical Filter Communications (OFC) 2000, Mar., 5–10, 2000 Baltimore, Maryland, www.osa.oyg/mtg–conf/OFC/2000/head.htm.

Fused Fiber Optic Variable Attenuator, Val Morozov et al. submitted to Optical Society of America as a conference paper, OFC–Optical Filter Comm. Conference 2000 Mar. 5–10, 2000 Baltimore, MD.

Fused Coupler Switch Using a Thermo–Optic Cladding, (Author unknown), Electronic Letters, V. 24, No. 8, 1988.

Low–Power, Optically Switched Fibre Directional Coupler, T.V. Clapp et al., Electronic Letters. V. 25 No. 2, Jan. 19, 1989.

A Primer on Shadow™ Technology for Variable Optical Attenuation, Molecular OptoElectronics Corporation, Version 7/99, Jul. 1999.

\* cited by examiner

*Primary Examiner*—Akm E. Ullah
(74) *Attorney, Agent, or Firm*—Lacasse & Associates; Randy W. Lacasse; Kevin E. Greene

(57) ABSTRACT

An apparatus that features an optical fiber with a core surrounded by a cladding, wherein at least one of the core and the cladding has a reduced thickness along an interval of the fiber to enlarge a modal field diameter of the guided mode in the fiber. A control layer is disposed on an external surface of the cladding along the interval. The control layer exhibits a strong change in its index of refraction as a function of temperature. The apparatus further includes a heating/cooling element and a controller to change the temperature of the control layer to more than two different levels, responsive to more than two different, corresponding attenuation settings for an optical signal to be guided by the fiber. In another embodiment of the invention, a coreless optical fiber is fused to the cladding of the optical fiber at the interval to achieve a flat wavelength response behavior. The control layer is formed at least on the external surface of the optical fiber, and may further be formed on an external surface of the coreless optical fiber.

20 Claims, 4 Drawing Sheets

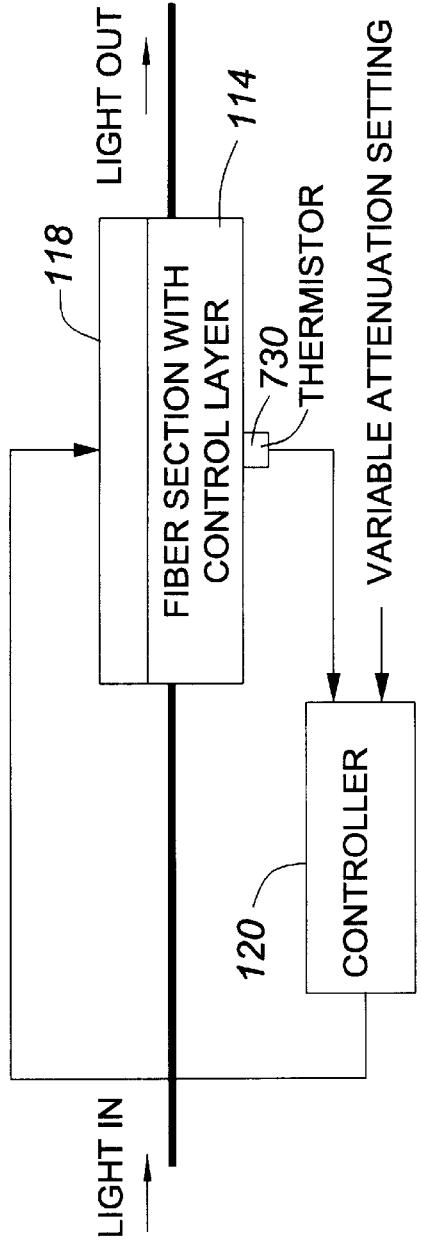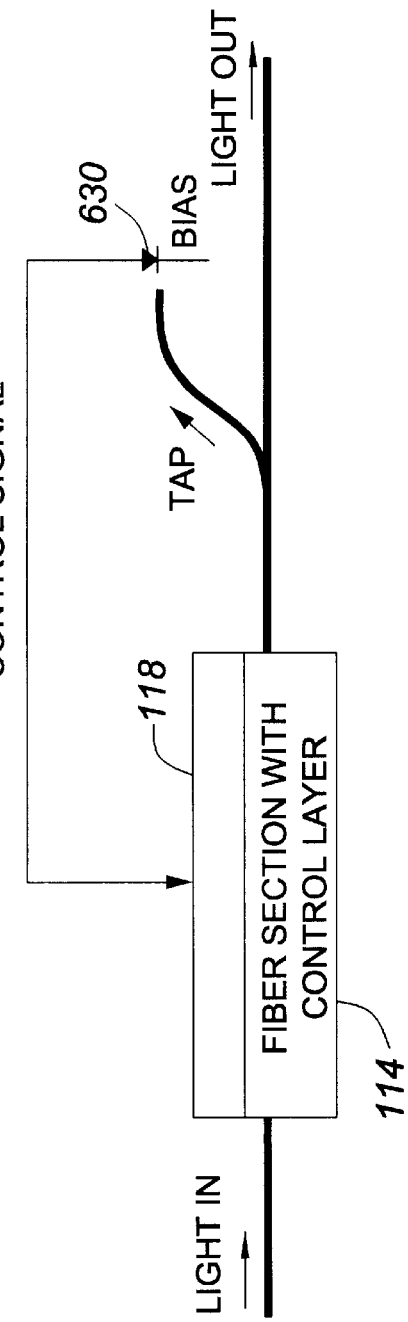

VARIABLE OPTICAL ATTENUATOR WITH THERMO-OPTIC CONTROL

FIELD OF THE INVENTION

This invention is generally related to optical attenuators and more particularly to variable fiber optic attenuators that use a thermo-optical control mechanism.

BACKGROUND

Variable fiber optic attenuators play an important role in the implementation of modern information networks having optical interconnects. For instance, in wave division multiplexed (WDM) optical networks having increased wavelength content and greater functionalities, optical channels of communication may be added, dropped, and/or rerouted at any node of the network. This flexibility makes the network more complex from an optical content point of view, such that it becomes important to carefully monitor the optical power in individual wavelength channels. Without such control, unacceptably high error rates may occur during propagation through communication channels having optical amplifiers, so called add-drop modules, multiplexers/de-multiplexers as well as other optical signal conditioning components. Accordingly, low cost, reliable devices to adjust the power level of the optical signals with high accuracy and high repeatability are needed.

Conventional variable optical attenuators have featured several types of architectures, including the use of a lossy fusion splice (see U.S. Pat. No. 4,557,557) and those that vary the distance from one optical fiber end-face to the end-face of an opposed optical fiber (see U.S. Pat. No. 5,050,956). More recently, an attenuator has been developed by Molecular Optoelectronics Corp. (MOEC) that allows electronic control of the attenuation by controlling the temperature of a control layer with an index of refraction that varies with temperature. The control layer is placed against the polished side (cladding) of a fiber to alter the boundary conditions of the optical signals traveling through the core of the fiber, resulting in the attenuation of the optical signal. The fiber side polishing technique, however, results in a rather expensive product due to the manufacturing process which is time and labor intensive.

SUMMARY

An apparatus that features an optical fiber with a core surrounded by a cladding, wherein the core has a reduced thickness along a control interval of the fiber to enlarge a modal field diameter of the guided mode in the fiber. A control layer is disposed on an external surface of the cladding along the control interval. The control layer exhibits a change in its index of refraction as a function of temperature. The apparatus further includes a controller to change the temperature of the control layer to more than two different levels, responsive to more than two different, corresponding attenuation settings for an optical signal to be guided by the fiber. In another embodiment of the invention, a coreless optical fiber is fused to the cladding of the optical fiber at the control interval. The control layer is formed at least on the external surface of the optical fiber, and may further be formed on an external surface of the coreless optical fiber.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

FIG. 7 is a schematic of an embodiment of an optical fiber attenuator in which the feedback signal to a closed loop controller is from a thermistor.

FIG. 8 shows the schematic of an embodiment of an optical fiber attenuator which increases attenuation in response to the transmitted optical power.

DETAILED DESCRIPTION

Figure 1:
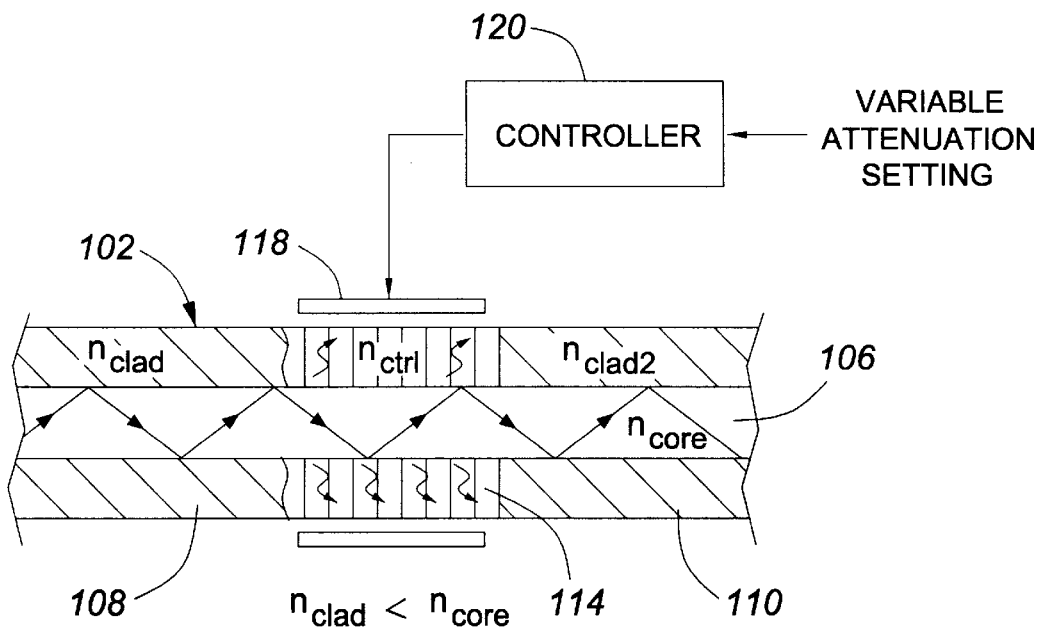
FIG. 1 illustrates an embodiment of an optical fiber having a modified cladding layer, where the original cladding is replaced by a control layer.

The description below is directed to variable optical fiber attenuators that obtain attenuation with low dependence on wavelength and polarization, compact size, small excess loss, as well as an overall relatively low manufacturing cost. FIG. 1 illustrates an embodiment of an optical fiber 102 in a cross section. The optical fiber 102 has a core 106 with an index of refraction $n_{core}$ and being covered by a first cladding section 108 and a second cladding section 110. The core and the cladding sections may be made of a conventional material such as silica glass arranged in a cylindrical geometry with a core region of high refractive index surrounded by a lower index cladding layer. In a particular embodiment, the optical fiber 102 is of a single mode type which can support guided waves in generally a single propagation mode for extremely large distances with low loss and low signal dispersion. Such single mode fibers are relatively thin, particularly as compared to multi-mode fibers which have a similar cylindrical geometry but with a much larger core diameter. The multi mode fiber may be made from either glass or plastic. In general, the invention here may be applicable to both single mode and multi mode fibers.

Light attenuation is achieved in the structure of FIG. 1 by modifying the boundary conditions for the guided light in the core 106. This is done by spacing the first and second cladding sections in a longitudinal axis along the core 106 by an intermediate section 114 having an index of refraction that is smaller than that of the first and second cladding sections 108, 110. This section is in contact with a surface of the core 106 and is capable of enlarging a modal field diameter of the fundamental guided mode in the fiber. When light propagates along this section, a modal field diameter of the fundamental guided mode is enlarged and coupling efficiency into the core of the fiber under the second cladding section 110 decreases, thereby inducing attenuation.

One way to obtain the intermediate section 114 is to first remove some of the original cladding to yield a gap between the two cladding sections 108 and 110 by chemical etching, and then depositing a polymer into the gap. The enlargement of the modal field is caused by the intermediate section 114 having an index of refraction $n_{ctrl}$ which is substantially equal to or slightly smaller than the core refractive index $n_{core}$. It may be expected that with $n_{ctrl}$ being substantially equal to $n_{core}$, the wave guide property of the structure in the intermediate section essentially disappears, such that there are light waves that propagate outwards away from the core 106. An attenuated guided wave, which is the output optical signal of the attenuator, may appear beyond the intermediate section 114. The attenuation of the optical signal increases as the length of the intermediate section 114 is increased.

To obtain variable attenuation from the structure of FIG. 1, the intermediate section 114 is formed of a material whose refractive index is a function of temperature. If the change in the refractive index can span a range that covers the difference $n_{core}-n_{clad}$, then, depending on the temperature of the intermediate section 114, the structure shown in FIG. 1 may be transformed from a fully "transparent" open state (essentially zero decibels (dB) attenuation) to a totally attenuated state (e.g. greater than 40 dB attenuation).

The optical fiber attenuator according to FIG. 1 also features a mechanism for setting the temperature of the intermediate section 114 to more than two different levels, responsive to more than two different, corresponding attenuation settings for an optical signal to be guided by the fiber. This may be achieved using the combination of a heating/cooling element 118 disposed near the control area 114 and an electronic controller 120. The variable attenuation setting is translated by the controller 120 into a control signal that instructs the heating/cooling element 118 to heat up or cool down as required to change $n_{ctrl}$ which in turn causes a change in the boundary conditions with the core 106, resulting in a change in the attenuation of the optical signal that is being guided in the core 106. The heating/cooling element may be, instance, a thermo-electric device.

Figure 2:
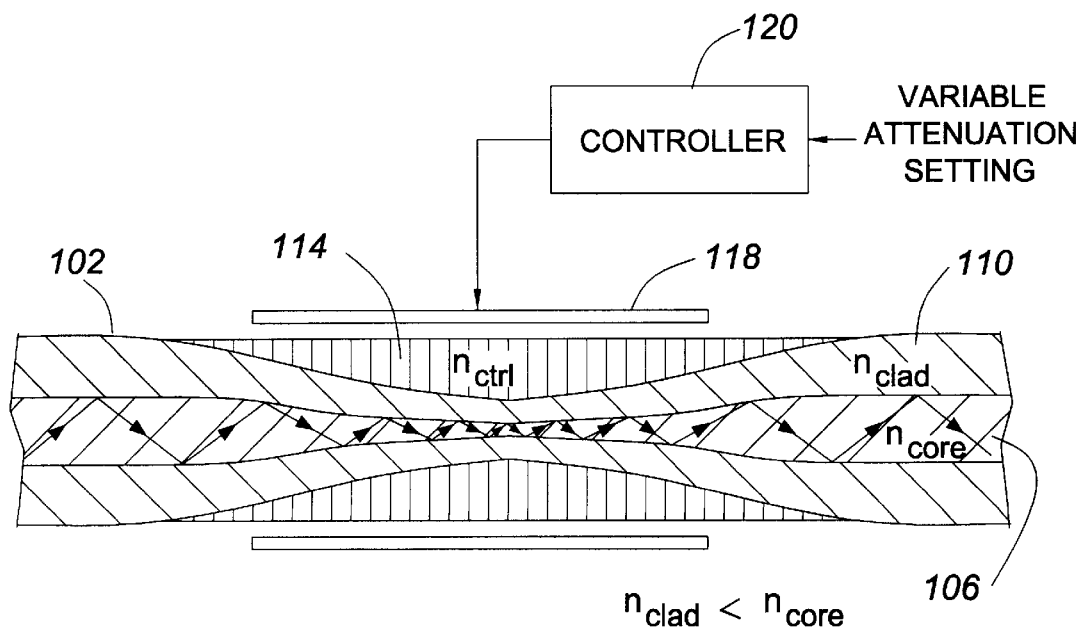
FIG. 2 shows a section of an embodiment of an optical fiber having thinned core and cladding in a control interval.

Another approach to the attenuator may be to use a three-layer fiber structure such as that shown in FIG. 2. In this embodiment, the optical fiber 102 is thinned in a control interval, such that the core will have a reduced thickness along the control interval. The fiber 102 is thinned so as to enlarge a modal field diameter of a guided mode in the fiber, extending this modal field from the core into the cladding 110 to obtain attenuation. Note that in this case, there is a continuous cladding 110 throughout the control layer 114, in contrast to the two-section cladding in the embodiment of FIG. 1. After the fiber 102 has been thinned in this manner, the control layer 114 may be formed as shown, disposed on an external surface of the cladding along the control interval which may be loosely defined as the length of a section of the fiber 102 covered by the control layer 114. The control layer 114 can exhibit a change in its index of refraction as a function of temperature, so that a range of $n_{clad}-n_{ctrl}$ may be obtained that allows a corresponding range of different attenuation levels for the optical signal guided in the core 106.

Note that in the attenuator of FIG. 2, the cladding 110 also has a reduced thickness along the control interval. This structure may be obtained by manufacturing the attenuator as follows. The optical fiber 102 is heated and then pulled along its longitudinal axis to form a tapered interval where both of the core and the cladding have a reduced thickness. This tapered interval essentially corresponds to the control interval as shown in FIG. 2 in which the control layer 114 has been formed. The control layer 114 is then formed on an external surface of the cladding 110 along the tapered interval. The control layer may be formed by, for instance, dipping the tapered interval into a polymer solution or spray coating the tapered interval with a polymer solution. To obtain a more efficient attenuation mechanism, one in which attenuation is more sensitive to a change in the temperature of the control layer 114, the entire external surface of the cladding 110 in the tapered interval is covered by the control layer 114.

The length of the control interval that features the control layer 114 depends on a number of factors, including the desired maximum attenuation level, the thickness of the core and the cladding 110 in the control interval, the thickness of the control layer 114, and the range of index of refraction in the control layer 114 which is a function of temperature.

The attenuation obtained by theattenuator in FIG. 2 may be explained as follows. The reduced thickness of the core changes the boundary conditions to which the propagating optical signal is subjected. This, in turn, causes an increase in the diameter of the modal field, extending the modal field into the cladding 110. As a result, a significant amount of the energy of the propagating optical signal appears near the outside edge of the cladding 110 in the control interval. With the addition of the control layer 114 having an index of refraction $n_{ctrl}$ some of this energy can be trapped in the cladding thereby reducing the optical power propagating inside the core 106, or the radiation in the cladding is not trapped therein but rather extends into the control layer 114. This also results in a reduction in the power of the fundamental propagating mode in the core 106. Thus, in both cases, attenuation of the fundamental propagation mode may be achieved.

It may be desirable to have an optical attenuator that is as sensitive as possible to the change in the index of refraction of the control layer, so that the amount of power that is needed to heat or cool the control layer is reduced. The larger the fraction of the modal field that fills the control layer 114, the more sensitive the modal field would be to the change in the refractive index of the control layer 114.

Figure 3:
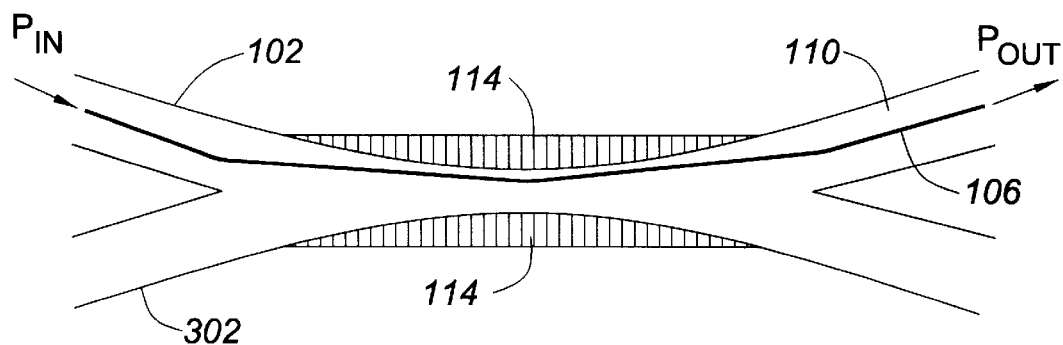
FIG. 3 shows the structure of an embodiment of an optical fiber attenuator in which a coreless fiber has been fused to the cladding of an optical fiber.

FIG. 3 illustrates another embodiment of the attenuator that helps achieve such efficiency by requiring a smaller change in the refractive index of the control layer, for the same range of attenuation. In this embodiment, the optical fiber 102 is fused with a coreless optical fiber 302 at the cladding 110 along the control interval. This may be achieved by a heating and pulling step that may be a modified version of a fused biconical tap (FBT) procedure conventionally used to form optical directional couplers. The control layer 114 is further extended to the external surface of the coreless optical fiber 302. The input of the optical signal is represented by Pin while the attenuated optical signal is represented by Pout.

Figure 4:
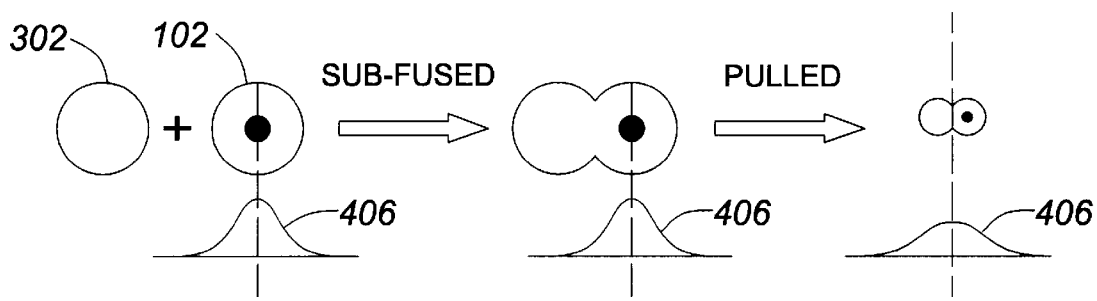
FIG. 4 shows the flow of an embodiment of a process of fusing two optical fibers in a way that leads to a shift of the modal field distribution.

The fusing of the coreless optical fiber 302 helps move the peak power of the modal field closer to the boundary between the core 106 and the cladding 110. This effect upon the modal field distribution is illustrated in FIG. 4, where the shift in a modal field distribution 406 occurs when the two fused fibers are heated and pulled to form a reduced thickness core and cladding, as shown in FIG. 3. Note that the modal field distribution 406 in the center of the core of the optical fiber 102 shifts to the left towards the fused coreless optical fiber 302. The absence of a core in the coreless fiber 302 is also useful because it helps eliminate any resonant exchange between two closely spaced fibers, a phenomenon typically known as coupling. The addition of the coreless optical fiber 302 has been found to yield wider wavelength band operation of the attenuator at the same insertion loss.

Figure 5:
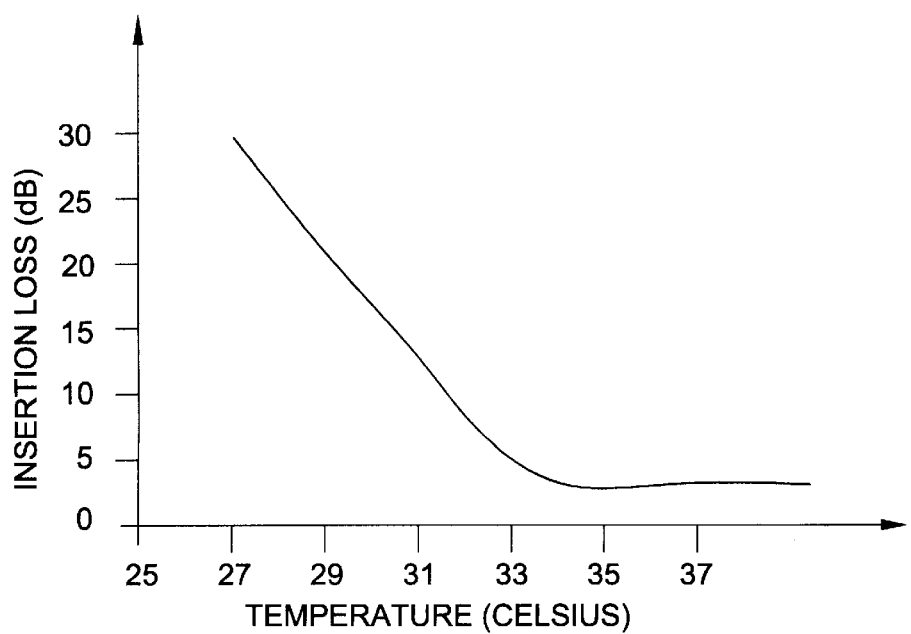
FIG. 5 shows insertion loss (attenuation) as a function of temperature that may be obtained from an embodiment of the attenuator.

FIG. 5 illustrates a plot of insertion loss in decibels (dB), or also referred to here as attenuation, as a function of the temperature near the control layer 114. It is shown that as the control layer 114 is heated, the insertion loss decreases continuously from more than 30 dB all the way down to less than 1 dB. Since the polymer refractive index decreases with temperature, to achieve a minimum attenuation level, the attenuator should be continuously heated. In the case of materials with opposite behavior of the refractive index versus temperature, the insertion loss increases with temperature.

As indicated earlier, the control layer 114 may be made of a polymer that exhibits a change in its index of refraction as a function of temperature. The control layer 114 may be made from a very low loss material, as is the core and the cladding of the optical fiber 102. A wide variety of polymers having indices from 1.4031 to 1.500 are available commercially. See also Polymer Handbook, J. Brandrup, editor, Wiley, John & Sons, 4th edition. The thermo-optical coefficients ($\Delta n/\Delta T$) in polymers are typically an order of magnitude larger than those of inorganic glasses that make up the core and cladding of conventional single mode fibers. As an example, the table below shows thermo-optical coefficients for a number of polymers each of which may be used to implement the various embodiments of the optical attenuators described here.

| POLYMER | THERMO-OPTIC COEFFICIENT (per degree Celsius) |
|---|---|
| PMMA | $-1.1 \times 10^{-4}$ |
| FPE (by 3M Corp.) | $-1.1 \times 10^{-4}$ |
| N61 (by Norland Inc.) | $-2.6 \times 10^{-4}$ |
| N68 (by Norland Inc.) | $-3.1 \times 10^{-4}$ |
| UV-100 (by Allied Signal Corp.) | $-2.5 \times 10^{-4}$ |

Although the thermo-optic coefficients provide valuable information about the temperature-induced change in the index of refraction, another significant quantity is A ($n_{TE}-n_{TM}$)/$\Delta t$ which gives a measure of the polarization dependent attenuation. It may be generally desirable to reduce, and maybe even minimize, the polarization dependent effects in an attenuator as much as possible, such that the polymer or other material selected for the control layer should exhibit a relatively small difference in the index of refraction of different modes, as a function of temperature.

Although the polymer is given as an example here for a material that makes up the control layer, various organic and inorganic materials may be molecularly engineered to allow for the fine tuning of the optical properties of the control layer, such as the index of refraction and absorption loss, in the spectral regions of interest. For instance, a mixture of a pairwise miscible monomer obtainable from Allied Signal Corp. may be used that spans refractive indices continuously from 1.35 to 1.55. Such monomers are preferably environmentally stable.

Figure 6:
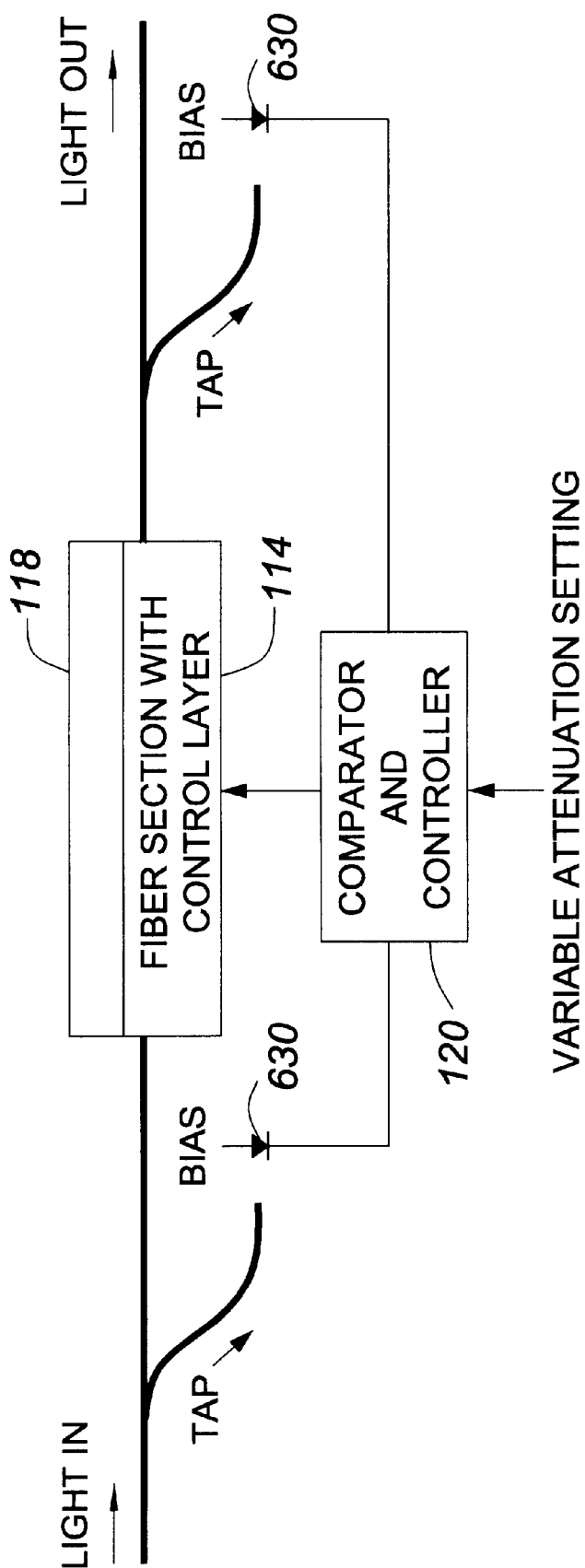
FIG. 6 shows a schematic of an embodiment of an optical fiber attenuator featuring closed loop control.

Turning now to FIGS. 6–8, these figures illustrate several examples of incorporating the optical fiber structures described above as part of an electronically controlled attenuator. FIG. 6 offers a closed loop system in which a comparator and controller 120 instruct the heater-cooler 118 to heat or cool the fiber section having the control layer 114 as required to adjust the attenuation in the optical signal to match the current variable attenuation setting. The correction made to the temperature of the control layer 114 is done in response to a comparison of the actual attenuation to the current setting. The actual attenuation may be determined by comparing the output power to the input power, as these are detected by photodetectors 630 which tap into the main optical fiber line. This scheme allows precise control of the attenuation, but does require that optical taps be provided. In contrast, the example in FIG. 7 shows a closed loop control system that does not require taps into the optical fiber. In this embodiment, the controller 120 has been previously provided with a table that maps temperature readings from a thermistor 730 to actual attenuation levels, where such information may be initially obtained by using an experimental setup similar to that of FIG. 6. First, the relationship between actual attenuation levels and the temperature at or near the control layer 114 (as provided by the thermistor 730) is obtained and tabulated. Then, a comparison is made between the current, variable attenuation setting and an attenuation level derived from a temperature value obtained from the thermistor 730, by referring to the predetermined table. Provided the thermistor 730 and the heater-cooler 118 exhibit good repeatability, the controller 120 may be configured to instruct the heater-cooler 118 to heat up or cool down in response to this comparison.

The attenuator embodiments in FIGS. 6 and 7 provide a closed loop control system to obtain variable attenuation settings in a fiber section having the control layer 114. If variable attenuation is not a required feature, but rather a simple limiting effect is needed, then the embodiment of FIG. 8 may be used to satisfy such a need with much lower cost. In this embodiment, no controller 120 is required. Rather, a simple limiting circuit is formed by tapping into the output attenuated light signal using a photodetector 630, and then using the electrical signal provided by the photodetector 630 as a control signal that instructs the heater-cooler 118 to, for instance, heat the control layer 114 so as to further attenuate the output light as the output light power approaches a pre-determined maximum level. Other schemes for controlling the attenuation in the fiber section with control layer 114 may be devised by one of ordinary skill in the art but are not described here for the sake of conciseness.

If the controller 120 is used to electronically control attenuation in the various embodiments of the invention described above, one of ordinary skill in the art will recognize that various implementations are possible for the controller 120. The controller 120 may be based on purely analog circuit components, or it may include a digital circuit which digitizes the analog values received from the photodetectors 630 and thermistor 730 and performs comparisons in the digital domain. The controller 120 may have a digital interface to a data processing system to permit software control of the variable attenuation setting. The controller 120 may be packaged together with the fiber section and the control layer 114, or, as an alternative, it may be provided on a separate circuit board.

To summarize, various embodiment s have been described t hat are directed to an improved variable optical attenuator and methods of manufacturing and using an improved optical attenuator. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
   an optical fiber having a core surrounded by a cladding, at least one of the core and the cladding having a reduced thickness alongan interval of the fiber to enlarge a modal field diameter of a guided mode in the fiber, a control layer disposed on an external surface of the cladding along the interval and that exhibits a change in its index of refraction as a function of temperature; and
   a controller to change the temperature of the control layer to more than two different levels in response to more than two different attenuation settings.

2. The method of claim 1 wherein the attenuation settings can be in the range 5–30 dB.

3. The apparatus of claim 1 wherein each of the cladding and the core has a reduced thickness along the control interval.

4. The apparatus of claim 1 further comprising a heater/cooler disposed adjacent to the control layer and coupled to respond to the controller.

5. The apparatus of claim 1 further comprising:
   a coreless optical fiber fused to the cladding of the optical fiber at the interval.

6. The apparatus of claim 5 wherein the control layer is further disposed on an external surface of the coreless optical fiber.

7. The apparatus of claim 1 wherein the control layer is made of a polymer.

8. The apparatus of claim 1 wherein the index of refraction of the control layer decreases with temperature, such that a minimum attenuation of approximately 0 dB is obtained only if the temperature of the control layer is above 20 degrees celsius.

9. A method for manufacturing an attenuator using an optical fiber having a core surrounded by a cladding, comprising:
   heating and pulling the optical fiber to form a tapered interval in which at least one of the core and the cladding have a reduced thickness; and
   forming a control layer on an external surface of the cladding along the tapered interval, the control layer including a material that exhibits a change in its index of refraction as a function of temperature.

10. The method of claim 9 further comprising:
    fusing a coreless optical fiber to the cladding of the optical fiber at the tapered interval.

11. The method of claim 10 further comprising:
    forming the control layer on an external surface of the coreless optical fiber.

12. The method of claim 10 wherein the forming of the control layer includes one of (1) dipping the tapered interval into a polymer solution, and (2) spray coating the tapered interval with a polymer solution.

13. The method of claim 9 further comprising:
    providing a heater/cooler adjacent to the control layer.

14. The method of claim 13 further comprising:
    changing the temperature of the control layer to more than two different levels in response to more than two different attenuation settings.

15. The method of claim 14 wherein the attenuation settings can be in the range 5–30 dB.

16. A method for attenuating an optical signal, comprising:
    generating an optical signal to be guided by an optical fiber having a core surrounded by a cladding, at least one of the core and the cladding having a reduced thickness along an interval of the fiber to enlarge a modal field diameter of a guided mode in the fiber, a control layer disposed on an external surface of the cladding along the interval and whose index of refraction can change as a function of temperature; and
    changing the temperature of the control layer to more than two different levels in response to more than two different attenuation settings.

17. The method of claim 16 wherein the attenuation settings can be in the range 5–30 dB.

18. An apparatus comprising:
    an optical fiber having a core, the core being covered by first and second cladding sections that are spaced in a longitudinal axis along the core by an intermediate section which (1) is in contact with a surface of the core, (2) is capable of enlarging a modal field diameter of a guided mode in the fiber, and (3) has an index of refraction that can change as a function of its temperature so that at certain temperatures, its index of refraction is different than that of the first and second claddings; and
    means for setting the temperature of the intermediate section to more than two different levels in response to more than two different attenuation settings for an optical signal guided by the fiber.

19. The apparatus of claim 18 wherein the temperature setting means comprises:
    a thermoelectric heater/cooler disposed adjacent to the intermediate section to heat up or cool down the intermediate section; and
    a controller coupled to instruct the thermoelectric heater/cooler in response to an input variable attenuation setting.

20. The apparatus of claim 18 wherein a thermooptic coeffecient of the intermediate section is at least an order of magnitude larger than that of the core and the cladding sections.

* * * * *